March 10, 1964 T. S. KULKA 3,124,243

TAPE REEL CLOSURE AND TAPE RETAINING MEANS

Filed July 9, 1962 3 Sheets-Sheet 1

INVENTOR

THOMAS S. KULKA

BY Elmon S. Nelson

ATTORNEY

TAPE REEL CLOSURE AND TAPE RETAINING MEANS

Filed July 9, 1962

3 Sheets-Sheet 2

INVENTOR
THOMAS S. KULKA

BY Elmon S. Nelson.
ATTORNEY

TAPE REEL CLOSURE AND TAPE RETAINING MEANS

Filed July 9, 1962

3 Sheets-Sheet 3

INVENTOR
THOMAS S. KULKA

BY Almon S. Nelson
ATTORNEY 3,124,243
Patented Mar. 10, 1964

1

3,124,243

TAPE REEL CLOSURE AND TAPE RETAINING MEANS

Thomas S. Kulka, 200 Film Bldg., 2108 Payne Ave., Cleveland, Ohio

Filed July 9, 1962, Ser. No. 208,516
19 Claims. (Cl. 206—53)

Figures 1, 2, 3, 4:
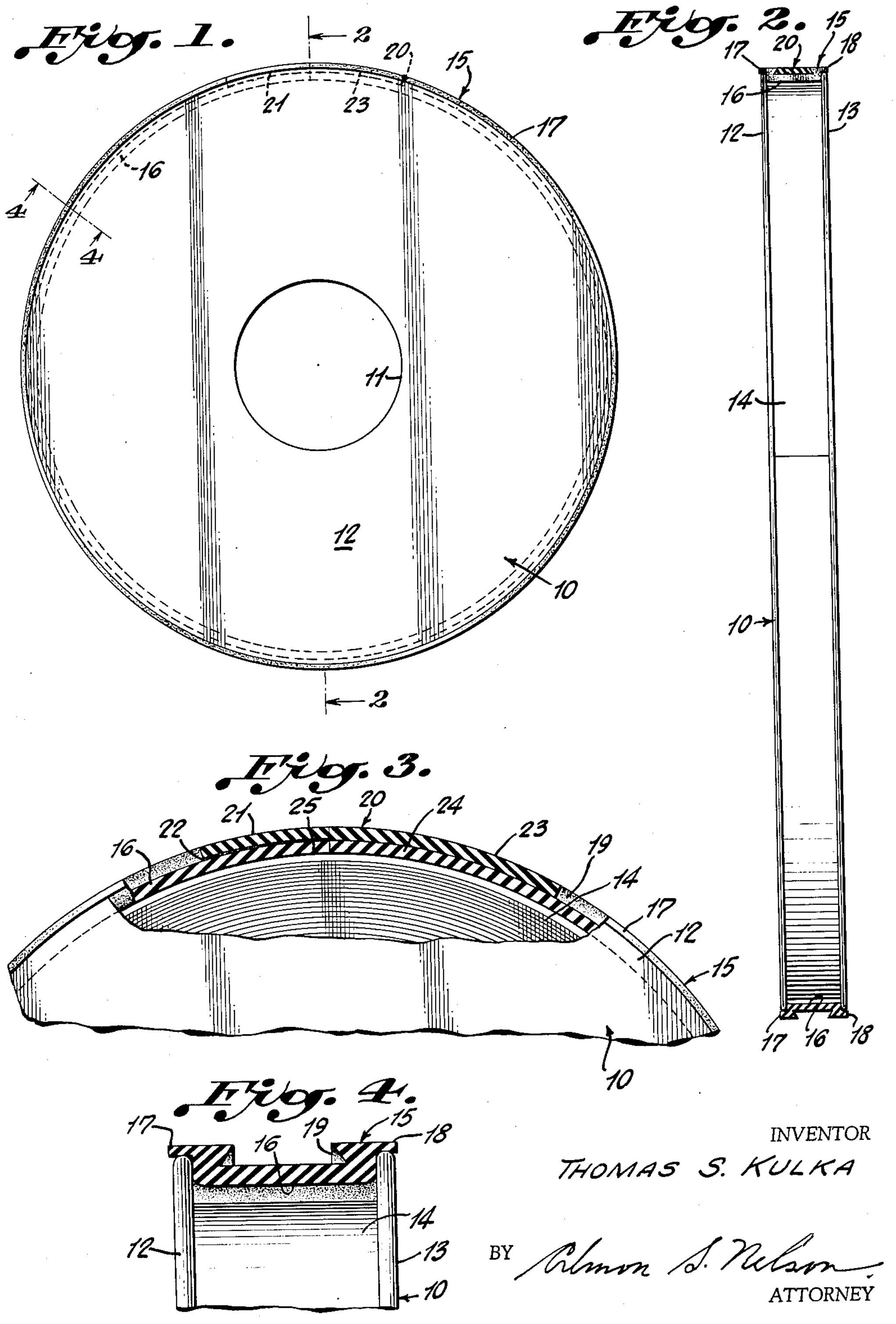

This invention relates to the handling and storage of material and more particularly to a tape reel closure and tape retaining means for application to a reel having tape wound thereon and in which the device of this invention provides a closure for the space between the flanges of the reel to protect tape wound thereon and also to retain the tape between the flanges of the reel when not in use.

The use of tape wound on reels has become extremely prevalent during the past few years largely by reason of the vastly increased use of magnetic tape for the recording of sound and also by the use of video tape and furthermore, magnetic tape has also found wide usage in electronic computers. These various uses of tape wound on reels is, of course, in addition to the use of film wound on reels, particularly in the motion picture field.

In utilizing tape wound on reels considerable difficulty has been experienced in properly retaining the tape on the reel when not in use and also in providing proper storage facilities to prevent damage to the tape and also to prevent contamination of the same by dust or other foreign materials. Various means have been proposed for overcoming these difficulties, but many of these are relatively complex and costly and do not in all cases satisfactorily solve the problem.

Of late it has become customary to supply a tape reel having imperforate flanges which, therefore, protect the side edges of the tape wound thereon and this invention proposes to utilize this feature in conjunction with a device for closing the outer circumference of the space between the flanges of the reel to provide a completely enclosed space in which the tape is disposed thereby protecting the same and the device at the same time maintains the tape between the flanges of the reels thereby preventing undue unwinding of the same. It is, therefore, apparent that the provision of reels having imperforate flanges makes it possible to provide a relatively simple and inexpensive device for affording complete protection of the tape and at the same time retaining the same on the reel.

It is accordingly an object of the invention to provide a tape reel closure and tape retaining means which may be applied to the flanges of the reel to close the space between the flanges and retain tape therebetween.

A further object of the invention is the provision of a tape reel closure and tape retaining means which may be conveniently and economically constructed from readily available material and which may be applied to a conventional tape reel and removed therefrom by a simple manual manipulation and without requiring the use of tools.

A still further object of the invention is the provision of a tape reel closure and tape retaining means which may be applied to the peripheral edges of the flanges of the reel to provide a tight and substantially dust-proof closure thereby affording protection for the tape wound

2 on the reel and for retaining the tape between the flanges of the reel.

Another object of the invention is the provision of a tape reel closure and tape retaining means including grooves for receiving the peripheral edges of the flanges of the reel in order to provide a substantially dust-tight closure for the space between the flanges of the reel.

A further object of the invention is the provision of a tape reel closure and tape retaining means in which a boss of yieldable material is provided on the inner surface of the device in order to engage the peripheral surface of tape wound on the reel, particularly where the peripheral surface of the tape is disposed a substantial distance inwardly from the peripheral edges of the reel flanges.

Figures 5, 6, 7, 8, 9, 10:
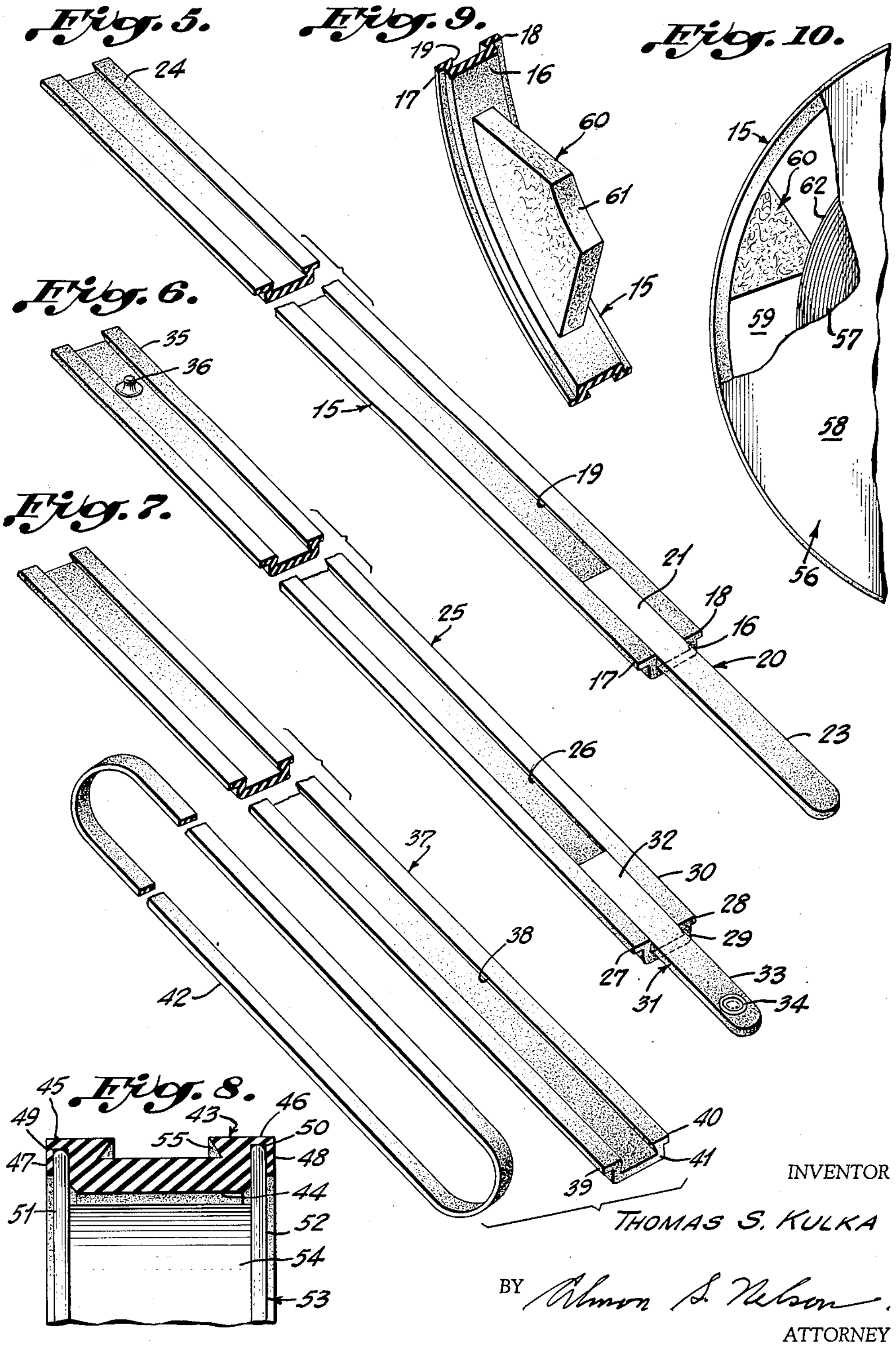
Figures 11, 12:
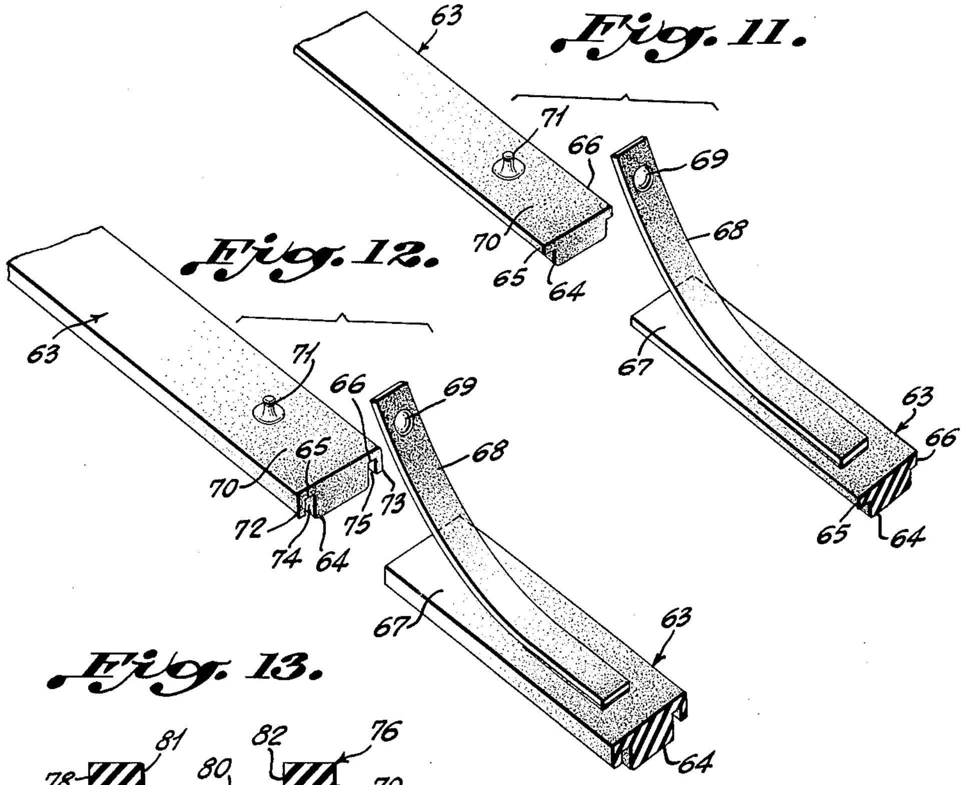
Figure 13:
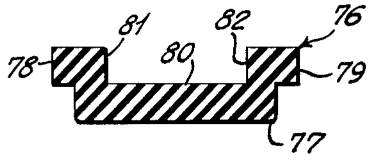
Figure 14:
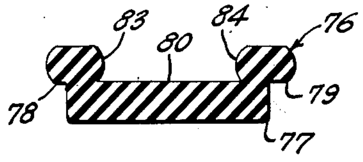
Figure 15:
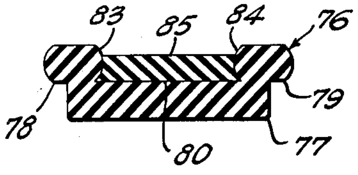
Figure 16:
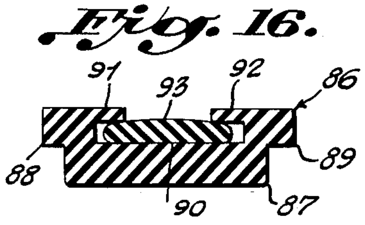
Figure 17:
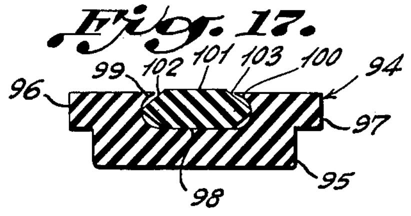

Further objects and advantages of the invention will be apparent from the following description taken in conjunction with the accompanying drawings wherein:

FIG. 1 is a side elevational view of a tape reel with the reel closure and tape retaining means of this invention applied thereto;

FIG. 2 a sectional view taken substantially on the line 2—2 of FIG. 1 and showing the manner of engagement of the device of this invention with the flanges of the reel;

FIG. 3 a fragmentary side elevational view with parts broken away and in section for greater clarity and showing one form of the means for maintaining the device of this invention in position on the reel;

FIG. 4 a sectional view to an enlarged scale and taken substantially on the line 4—4 of FIG. 1;

FIG. 5 a view in perspective showing the tape reel closure and tape retaining means of this invention prior to application to the reel of FIG. 1;

FIG. 6 a view similar to FIG. 5, but showing a slightly modified form of means for maintaining the device in place on the reel;

FIG. 7 a view similar to FIG. 5 and showing a still further modified means for maintaining the device in place on the reel;

FIG. 8 a sectional view similar to FIG. 4, but showing a modified device in which grooves are provided for receiving the edges of the flanges of the reel;

FIG. 9 a view in perspective showing the device of this invention provided with a boss on the inner surface thereof for engaging the peripheral surface of tape wound on the reel;

FIG. 10 a fragmentary side elevational view with parts broken away for greater clarity and showing the manner in which the boss on the device of this invention engages the tape on the reel to prevent unwinding thereof;

FIG. 11 a fragmentary view in perspective showing a modified form of the invention in which the groove in the strap is omitted;

FIG. 12 a fragmentary view in perspective showing a modified form of the invention similar to FIG. 11, but providing grooves for receiving the edges of the flanges of the reel;

FIG. 13 a transverse sectional view showing a strap having a generally rectangular groove with parallel sidewalls when the strap is in straight or flat condition;

FIG. 14 a view similar to FIG. 13, but showing the inward bulge of the sidewalls of the groove when the strap is positioned around a reel;

FIG. 15 is a view similar to FIG. 14, but showing the manner in which the inwardly projecting sides of the groove engage the securing tab;

FIG. 16 a transverse sectional view showing a further modified form of groove in which inwardly projecting annular flanges overhang the groove with the securing tab received in the groove beneath the flanges; and FIG. 17 a transverse sectional view showing a still further modified form of groove in which the same is provided with outwardly curved sidewalls and in which the side edges of the securing tab are tapered outwardly to engage in the arcuate recesses provided by the outwardly curved sidewalls of the groove.

With continued reference to the drawing and particularly FIGS. 1 to 4, there is shown a conventional tape reel 10 having a hollow hub 11 and side flanges 12 and 13. As shown in FIGS. 2, 3 and 4, tape 14 is wound on the reel 10 between the flanges 12 and 13 to a diameter slightly less than the diameter of the flanges 12 and 13.

With particular reference to FIG. 5, the tape reel closure and tape retaining means of this invention may well comprise a strap 15 of suitable yieldable material, such as rubber or the like, and of a length to extend around the periphery of the flanges 12 and 13 of the reel 10. The strap 15 as best shown in FIGS. 2 and 4 is provided with a body portion 16 of a width to be tightly received between the flanges 12 and 13 of the reel and annular flanges 17 and 18 are provided on opposite side edges of the body portion 16 for engaging the peripheral edges of the flanges 12 and 13 of the reel 10, as clearly shown in FIGS. 2 and 4. The width of the body portion 16 is such that the same must be slightly compressed to pass between the flanges 12 and 13 of the reel 10 and this fact, together with the engagement of the annular flanges 17 and 18 with the peripheral edges of the flanges 12 and 13 provide a relatively tight closure for the space between the flanges 12 and 13. The annular flanges 17 and 18 serve to limit inward movement of the strap 15 between the flanges 12 and 13 thereby preventing movement of the strap 15 inwardly to a point in engagement with the peripheral surface of the tape 14 thereby preventing inadvertent damage to the tape and also facilitating removal of the strap 15 from the reel 10 which would be somewhat difficult if the strap 15 were disposed inwardly of the edges of the flanges 12 and 13 of the reel 10.

The body portion 16 of the strap 15 is provided with a longitudinal dovetail groove 19 in the outer surface thereof and extending throughout the length of the strap 15 and adjacent one end of the strap 15 there is provided an elongated tab 20 of flexible material with one end 21 of the tab 20 secured in the dovetail groove 19 by cement as shown at 22 in FIG. 3, or the tab 20 may be secured in the groove 19 by vulcanization or in any other suitable manner. The opposite end 23 of the tab 20 projects beyond the end of the strap 15 and the width of the projecting portion 23 of the tab 20 is greater than the width of the dovetail groove 19 for a purpose which will presently appear.

In use, the strap 15 is wrapped around the edges of the flanges 12 and 13 of the reel 10 as shown in FIGS. 1 to 4, and with the annular flanges 17 and 18 engaging the peripheral edges of the flanges 12 and 13 of the reel 10. In order to secure the strap 15 in place on the reel 10, the projecting portion 23 of the tab 20 is forced into the dovetail groove 19 in the end portion 24 of the strap 15 and the frictional engagement of the projecting portion 23 of the tab 20 with the walls of the dovetail groove 19 is sufficient to maintain the strap 15 in place on the reel 10. When it is desired to remove the strap 15 from the reel 10, it is only necessary to pull the projecting portion 23 of the tab 20 out of the dovetail groove 19, after which the entire strap 15 may be conveniently removed from the reel 10. As will be seen from an inspection of FIG. 3, the end 24 of the strap 15 abuts or closely approaches the end 25 thereof and consequently, a substantially dust-tight closure is provided for the space between the flanges 12 and 13 of the reel 10. Therefore, as will be seen from an inspection of FIGS. 2 and 4, any substantial unwinding of the tape 14 on the reel is prevented and in any event, the tape is maintained between the flanges of the reel and cannot escape therefrom while the strap 15 is in place on the reel.

With particular reference to FIG. 6, there is shown a slightly modified form of the invention in which a strap 25 similar to that shown in FIG. 5 is provided and the strap 25 is also provided with a longitudinal dovetail groove 26 extending throughout the length thereof. As in FIG. 5, the strap 25 is also provided with annular flanges 27 and 28 which, together with the body portion 29 engage the flanges of the reel in the same manner as the strap 15 of FIG. 5. Secured in the groove 26 at one end 30 of the strap 25 is a tab 31 of flexible material with the end 32 of the tab 31 being secured by cement, vulcanization or in any other suitable manner to the strap 25 and the projecting end portion 33 of the tab 31 is provided with a snap fastener 34. The opposite end 35 of the strap 25 is provided with a snap fastener 36 which mates with the snap fastener 34 and in this form of the invention, the strap 25 is applied to the reel in the same manner as the strap 15 of the FIG. 5 and in addition to the frictional engagement of the extending portion 33 of the tab 31 with the walls of the dovetail groove 26, the strap is also further held in place by engagement of the snap fastener 34 on the tab 31 with the snap fastener 36 on the end 35 of the strap 25. The form of the invention shown in FIG. 6 operates in the same manner as that shown in FIG. 5 to provide protection for the film wound on the reel and to prevent escape of the same from between the flanges of the reel.

In FIG. 7, there is shown a still further modified form of the device in which a strap 37 of the same character as the strap 15 of FIG. 5 is provided with a longitudinally extending dovetail groove 38 and with annular flanges 39 and 40 projecting from opposite side edges of the body portion 41 of the strap 37. In this case, the strap 37 is applied to the reel in the same manner as the strap 15 of FIG. 5, but the strap 37 is retained on the reel by an endless band 42 which is disposed in the dovetail groove 38 and extends entirely around the reel and if desired, the band 32 may be of elastic material, such as rubber or any other suitable material.

With particular reference to FIG. 8, there is shown a still further modified form of the invention in which a strap 43 similar to the strap 15 of FIG. 5, is provided with a body portion 44 and annular flanges 45 and 46 projecting from opposite side edges of the body portion 44. Inwardly directed radial flanges 47 and 48 extend inwardly from the outer edges of annular flanges 45 and 46 to provide grooves 49 and 50 for receiving the peripheral edges of the flanges 51 and 52 of a reel 53. As before, tape 54 is wound on the reel 53 to substantially fill the space therebetween. This form of the invention serves to provide a closure somewhat more dust-proof than that provided by the other forms of the invention in which no grooves are provided for reception of the peripheral edges of the flanges of the reel. As in the other forms of the invention, the strap 43 is provided with a longitudinally extending dovetail groove 55 and any of the above described forms of retaining means cooperating with the groove 55 may be utilized to retain the strap 43 on the reel.

In some instances, a reel may be only partially filled with tape and where this situation exists, it may be desirable to prevent any unwinding of the tape on the reel and for this purpose, there is shown in FIGS. 9 and 10 a form of this invention which may be utilized for retaining the tape on partially filled reels. With particular reference to FIGS. 9 and 10, there is shown a reel 56 in which tape 57 only partially filled the space between the flanges 58 and 59 and for preventing unwinding of the tape 57, the strap 15 of FIG. 5 may be provided on the inner surface thereof with an inwardly projecting boss 60 which may be formed of suitable yieldable material, such as a plastic foam, sponge rubber or the like, and preferably the inner surface 61 of the boss 60 is arcuate in formation in order to substantially conform to the peripheral surface of the tape 62 with which the same is in engagement when in position on the reel as clearly shown in FIG. 10. The boss 60 may, of course, be provided on the straps of any of the forms of the invention above described and will operate in the same manner. The boss 60 may be applied to the tape 15 by cement, vulcanization or in any other desirable manner.

With particular reference to FIG. 11, there is shown a still further modified form of the invention in which a strap 63 of flexible material is provided with a body portion 64 to be tightly received between the flanges of a reel and outwardly projecting annular flanges 65 and 66 which engage the peripheral edges of the flanges of the reel in order to properly position the strap 63 therebetween.

One end 67 of the strap 63 is provided with an elongated securing tab 68 of flexible material and which may be secured to the strap 63 by cement or in any other desired manner and the tab 68 is provided with a snap fastener 69 adjacent the free end thereof. The opposite end 70 of the strap 63 is provided with a mating snap fastener 71 which cooperates with the snap fastener 69 on the tab 68 to secure the strap 63 around the flanges of the reel in the same manner as the form of the invention shown in FIG. 6.

In FIG. 12, there is shown a form of the invention which is identical with that shown in FIG. 11, insofar as the strap securing means is concerned and consequently, like reference numerals will be utilized in FIG. 12 to indicate the same elements shown in FIG. 11 and described above. The form of the invention shown in FIG. 12 differs from that shown in FIG. 11 by providing inwardly directed radial flanges 72 and 73 extending from the outer ends of the annular flanges 65 and 66 to provide inwardly opening grooves 74 and 75 to receive the outer edges of the flanges of the reel, thereby providing an additional closing function for the space between the flanges of the reel.

With particular reference to FIG. 13, there is shown a strap 76 having a body portion 77 to be tightly received between the flanges of the reel and outwardly extending annular flanges 78 and 79 for engaging the outer edges of the flanges of the reel in the manner described above. The strap 76, as shown in FIG. 13, is provided with a longitudinal groove 80 which, when the strap 76 is in straight flat condition, is generally rectangular in cross section and is provided with substantially parallel sidewalls 81 and 82. When the strap 76 is curved around the flanges of a reel, the sidewalls 81 and 82 of the groove 80 will bulge inwardly, as shown at 83 and 84, in FIG. 14 and as shown in FIG. 15, this change in the formation of the sidewalls of the grooves 80 will operate to cause the inwardly bulging portions 83 and 84 to tightly engage the side edges of the securing tab 85, as clearly shown in FIG. 15, to secure the strap 76 in place around the flanges of the reel. By reason of this feature, it is not necessary to depend upon an initial tight engagement between the securing tab and the sidewalls of the groove when the strap is in a straight and flat condition, since even though the tab may be loosely received within the groove in this condition, the same is tightly received therein when the strap is curved around the flanges of the reel.

With reference to FIG. 16, there is shown a strap 86 having a body portion 87 to be tightly received between the flanges of the reel and outwardly projecting annular flanges 88 and 89 for engaging the outer edges of the flanges of the reel in the manner described above. The strap 86 is provided with a longitudinally extending groove 90 and projecting inwardly from the outwardly extending annular flanges 88 and 89 are inwardly projecting annular flanges 91 and 92 which overhang the groove 90, as clearly shown in FIG. 16. In this form of the invention, the securing tab 93 is received in the groove 90 beneath the overhanging flanges 91 and 92 which provides a firm frictional engagement between the tab 93 and the bottom surface of the groove 90 and the overhanging flanges 91 and 92.

In FIG. 17, there is shown a further modified form of the invention in which the strap 94 is provided with a body portion 95 to be tightly received between the flanges of a reel and outwardly extending annular flanges 96 and 97 to engage the outer edges of the flanges of the reel in the manner described above. The strap 94 is provided with a longitudinally extending groove 98 having outwardly curved sidewalls 99 and 100 which serve to provide inwardly opening arcuate recesses. A securing tab 101 is provided with outwardly tapering side edges 102 and 103 which, as clearly shown in FIG. 17, engage within the recesses provided by the outwardly curved sidewalls 99 and 100 of the groove 98, thereby providing a firm frictional engagement between the securing tab 101 and the walls of the groove 98.

It will be seen that by the above described invention there has been provided an extremely simple, yet highly effective device for protecting tape wound on a reel against contamination from dust or other foreign material and also for retaining the tape on the reel between the flanges thereof. The device of this invention is relatively inexpensive to construct and extremely convenient to use and may be supplied in sizes suitable for all standard tape reels. Furthermore, the device may be conveniently applied to or removed from a reel in the dark by simple manipulation thereof requiring no tools and this feature is important where the same may be used for reels containing photographic film and for any other uses where for any reason visual observation of the operation is not possible or is impractical. In applying the strap to the reel, one very convenient way is merely to insert one end of the strap between the flanges of the reel and thereafter roll the reel along the strap and by reason of the frictional engagement of the body portion of the strap between the flanges of the reel, the same will automatically be wound on the reel and retained thereon until the securing means in the form of the tab or the endless band is applied thereto.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A tape reel closure and tape retaining means comprising a strap of yieldable material and of a length to extend around the periphery of the flanges of a reel, said strap having a body portion of a width to be tightly received between the flanges of the reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal dovetail groove in the outer surface extending throughout the length of said strap and an elongated tab of flexible material secured in said groove adjacent one end of said strap and projecting beyond the end of said strap, the width of said projecting portion being equal to or greater than the width of said groove, whereby with said strap received around a reel and with said body portion disposed between the flanges of the reel, the projecting portion of said tab may be forced into the groove in the opposite end portion of said strap to hold said strap in position on the reel.

2. A tape reel closure and tape retaining means as defined in claim 1, in which the free end of said tab is provided with a snap fastener and a mating snap fastener is provided on the opposite end of said strap.

3. A tape reel closure and tape retaining means as defined in claim 1, in which inwardly projecting radial flanges are provided on said annular flanges to provide grooves for receiving the peripheral edges of the flanges of the reel.

4. A tape reel closure and tape retaining means as defined in claim 2, in which inwardly projecting radial flanges are provided on said annular flanges to provide grooves for receiving the peripheral edges of the flanges of the reel.

5. A tape reel closure and tape retaining means comprising a strap of yieldable material and of a length to extend around the periphery of the flanges of a reel, said strap having a body portion of a width to be tightly received between the flanges of a reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal dovetail groove in the outer surface extending throughout the length of said strap and means disposed in said groove for retaining said strap in position around the flanges of the reel.

6. A tape reel closure and tape retaining means as defined in claim 5, in which the means disposed in said groove comprises an endless elastic band.

7. A tape reel closure and tape retaining means as defined in claim 5, in which inwardly projecting radial flanges are provided on said annular flanges to provide grooves for receiving the peripheral edges of the flanges of the reel.

8. A tape reel closure and tape retaining means as defined in claim 6, in which inwardly projecting radial flanges are provided on said annular flanges to provide grooves for receiving the peripheral edges of the flanges of the reel.

9. A tape reel closure and tape retaining means as defined in claim 1, in which an inwardly projecting boss of yieldable material is provided on the inner surface of said strap for engaging the peripheral surface of tape wound on the reel.

10. A tape reel closure and tape retaining means as defined in claim 2, in which an inwardly projecting boss of yieldable material is provided on the inner surface of said strap for engaging the peripheral surface of tape wound on the reel.

11. A tape reel closure and tape retaining means as defined in claim 3, in which an inwardly projecting boss of yieldable material is provided on the inner surface of said strap for engaging the peripheral surface of tape wound on the reel.

12. A tape reel closure and tape retaining means as defined in claim 6, in which an inwardly projecting boss of yieldable material is provided on the inner surface of said strap for engaging the peripheral surface of tape wound on the reel.

13. A tape reel closure and tape retaining means comprising a strap of yieldable material and of a length to extend around the periphery of the flanges of a reel, said strap having a body portion of a width to be tightly received between the flanges of the reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal groove in the outer surface at one end of the strap and an elongated tab of flexible material secured to the opposite end of the strap and projecting beyond the opposite end of said strap, the width of said projecting portion being equal to or greater than the width of said groove, whereby with said strap received around a reel and with said body portion disposed between the flanges of the reel, the projecting portion of said tab may be forced into the groove in the opposite end portion of said strap to hold said strap in position on the reel.

14. A tape reel closure and tape retaining means comprising a strap of yieldable material and of a length to extend around the periphery of the flanges of a reel, said strap having a body portion of a width to be adequately received between the flanges of a reel, to retain said strap on said reel, annular flanges on opposite side edges of said body portion for engaging the peripheral edges of the flanges of the reel to limit radial inward movement of the body portion between the flanges of the reel and provide a closure for the space between the flanges of the reel and strap retaining means for retaining said strap in position around the flanges of the reel.

15. A tape reel closure and tape retaining means as defined in claim 14, in which said strap retaining means comprises an elongated tab of flexible material secured to said strap adjacent one end, a snap fastener on said tab and a mating snap fastener on said strap adjacent the other end.

16. A tape reel closure and tape retaining means comprising a strap of yieldable material and of a length to extend around the periphery of the flanges of a reel, said strap having a body portion of a width to be tightly received between the flanges of the reel, to retain said strap on said reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal groove in the outer surface and strap retaining means received in said groove for retaining said strap in position around the flanges of the reel.

17. A tape reel closure and tape retaining means comprising a strap of yieldable material and of a length to extend around the periphery of the flanges of a reel, said strap having a body portion of a width to be tightly received between the flanges of the reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal groove in the outer surface and strap retaining means received in said groove for retaining said strap in position around the flanges of the reel, said groove being rectangular in cross-section with parallel side walls when said strap is straight and upon bending said strap around said flanges said sidewalls bulge inwardly to grip said strap retaining means.

18. A tape reel closure and tape retaining means comprising a strap of yieldable material and of a length to extend around the periphery of the flanges of a reel, said strap having a body portion of a width to be tightly received between the flanges of the reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal groove in the outer surface and strap retaining means received in said groove for retaining said strap in position around the flanges of the reel, said strap being provided with inwardly projecting annular flanges overhanging said groove, said strap retaining means being received in said groove beneath said overhanging flanges.

19. A tape reel closure and tape retaining means comprising a strap of yieldable material and of a length to extend around the periphery of the flanges of a reel, said strap having a body portion of a width to be tightly received between the flanges of the reel, annular flanges on opposite side edges of said body portion for engaging the peripheral edges of the flanges of the reel to limit radial inward movement of the body portion between the flanges of the reel and provide a closure for the space between the flanges of the reel, said body portion having a longitudinal groove in the outer surface and strap retaining means received in said groove for retaining said strap in position around the flanges of the reel, said groove being provided with outwardly curved sidewalls and said strap retaining means comprising a flexible generally rectangular member having outwardly tapering side edges.

References Cited in the file of this patent

UNITED STATES PATENTS

| | | |
|---|---|---|
| 1,345,129 | Clarke | June 29, 1920 |
| 1,488,322 | Doty | Mar. 25, 1924 |
| 1,797,539 | Arthur | Mar. 24, 1931 |
| 3,012,662 | Kulks | Dec. 12, 1961 |
| 2,397,087 | Camras | Mar. 26, 1946 |
| 3,095,969 | Morrison | July 2, 1963 |